(12) United States Patent
Yagi et al.

(10) Patent No.: US 11,491,759 B2
(45) Date of Patent: Nov. 8, 2022

(54) COMPOSITE LAMINATE AND METHOD FOR PRODUCING SAME

(71) Applicant: OTSUKA CHEMICAL CO., LTD., Osaka (JP)

(72) Inventors: Hiroshi Yagi, Tokushima (JP); Kousuke Inada, Tokyo (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 37 days.

(21) Appl. No.: 16/756,167

(22) PCT Filed: Nov. 26, 2018

(86) PCT No.: PCT/JP2018/043317
§ 371 (c)(1),
(2) Date: Apr. 15, 2020

(87) PCT Pub. No.: WO2019/111737
PCT Pub. Date: Jun. 13, 2019

(65) Prior Publication Data
US 2020/0331233 A1    Oct. 22, 2020

(30) Foreign Application Priority Data

Dec. 5, 2017 (JP) .............................. JP2017-233512

(51) Int. Cl.
*B32B 5/26* (2006.01)
*B32B 27/18* (2006.01)
(Continued)

(52) U.S. Cl.
CPC ................ *B32B 5/26* (2013.01); *B32B 27/18* (2013.01); *B32B 27/281* (2013.01); *B32B 27/34* (2013.01);
(Continued)

(58) Field of Classification Search
CPC .......... B32B 5/26; B32B 27/18; B32B 27/281; B32B 27/34; B32B 2262/0261;
(Continued)

(56) References Cited

U.S. PATENT DOCUMENTS

| | | | | |
|---|---|---|---|---|
| 4,291,084 A | * | 9/1981 | Segal | ..................... B32B 27/04 428/474.9 |
| 2007/0142571 A1 | * | 6/2007 | Maekawa | ............... C08L 69/00 525/439 |

(Continued)

FOREIGN PATENT DOCUMENTS

| | | |
|---|---|---|
| CN | 103302927 A | 9/2013 |
| CN | 103806357 A | 5/2014 |

(Continued)

OTHER PUBLICATIONS

International Search Report dated Feb. 12, 2019, issued in counterpart International Application No. PCT/JP2018/043317 (1 page).
(Continued)

*Primary Examiner* — John D Freeman
(74) *Attorney, Agent, or Firm* — WHDA, LLP (57) ABSTRACT

Provided is a composite laminate having excellent releasability from a mold during a production process and having excellent surface appearance (surface smoothness). A composite laminate 1 including an A layer 2 and a B layer 3, the A layer 2 being provided on one or both sides of the B layer 3, the A layer 2 containing inorganic fibers (a1) with an average fiber length of 1 μm to 300 μm and a thermoplastic resin (a2), the B layer 3 containing reinforcing fibers (b1) with an average fiber length of 1 mm or more and a thermoplastic resin (b2).

15 Claims, 1 Drawing Sheet

(51) Int. Cl.
  *B32B 27/28* (2006.01)
  *B32B 27/34* (2006.01)
  *C08J 5/04* (2006.01)

(52) U.S. Cl.
  CPC .............. *C08J 5/042* (2013.01); *C08J 5/043* (2013.01); *C08J 5/046* (2013.01); *B32B 2262/0261* (2013.01); *B32B 2262/101* (2013.01); *B32B 2262/103* (2013.01); *B32B 2262/105* (2013.01); *B32B 2262/106* (2013.01); *B32B 2605/08* (2013.01)

(58) Field of Classification Search
  CPC ........ B32B 2262/101; B32B 2262/103; B32B 2262/105; B32B 2262/106; B32B 2605/08; B32B 2262/0269; B32B 2260/046; B32B 19/06; B32B 5/28; B32B 27/20; B32B 2260/021; C08J 5/042; C08J 5/043; C08J 5/046; C08J 5/0405; C08J 5/04; C08K 7/02
  See application file for complete search history.

(56) References Cited

U.S. PATENT DOCUMENTS

| | | |
|---|---|---|
| 2011/0143087 A1 | 6/2011 | Alberding et al. |
| 2011/0143110 A1 | 6/2011 | Tsuchiya et al. |
| 2012/0012263 A1 | 1/2012 | Tsuchiya et al. |
| 2017/0001336 A1 | 1/2017 | Tamai et al. |
| 2019/0152212 A1* | 5/2019 | Tseng ...................... B29C 70/34 |
| 2019/0177510 A1 | 6/2019 | Inada et al. |

FOREIGN PATENT DOCUMENTS

| | | |
|---|---|---|
| CN | 105882076 A | 8/2016 |
| JP | 7-90118 A | 4/1995 |
| JP | H09-291210 A | 11/1997 |
| JP | 10-279704 A | 10/1998 |
| JP | 2000-256505 A | 9/2000 |
| JP | 2005-171242 A | 6/2005 |
| JP | 2009-286817 A | 12/2009 |
| JP | 2010-235779 A | 10/2010 |
| JP | 2012-240326 A | 12/2012 |
| JP | 2015-51629 A | 3/2015 |
| JP | 2015-085613 A | 5/2015 |
| JP | 2015-127141 A | 7/2015 |
| JP | 2016-107485 A | 6/2016 |
| KR | 10-2016-0115919 A | 10/2016 |
| WO | 2015/080019 A1 | 6/2015 |
| WO | 2018/043231 A1 | 3/2018 |

OTHER PUBLICATIONS

Notification of Transmittal of Translation of the International Preliminary Report on Patentabililty (Form PCT/IB/338) issued in counterpart International Application No. PCT/JP2018/043317 dated Jun. 18, 2020 with Forms PCT/IB/373 and PCT/ISA/237. (9 pages).
Extended European Search report dated Jul. 30, 2021, issued in counterpart EP Application No. 18886029.0. (10 pages).
Office Action dated Aug. 4, 2021, issued in counterpart CN Application No. 201880078222.1. (7 pages).
Office Action dated Feb. 18, 2022, issued in counterpart KR application No. 10-2020-7015739, with English translation. (15 pages).
Office Action dated Feb. 17, 2022, issued in counterpart CN application No. 201880078222.1, with English translation. (15 pages).

* cited by examiner

COMPOSITE LAMINATE AND METHOD FOR PRODUCING SAME

TECHNICAL FIELD

The present invention relates to fiber-reinforced composite laminates and methods for producing the composite laminates.

BACKGROUND ART

Fiber-reinforced resin is lightweight and strong and is therefore used as a material to replace metal in various fields, including golf clubs, tennis rackets, aircraft, and motor vehicles. Particularly, because of recent demands for weight saving of vehicles to achieve low fuel consumption, fiber-reinforced resin has attracted attention in the motor vehicle field. However, there are various problems to solve in order to use fiber-reinforced resin for motor vehicle members. For example, fiber-reinforced resin made of thermosetting resin needs to be thermally treated (undergo a curing reaction) after being molded, which prevents achievement of high productivity and low cost essential for the production of motor vehicle members. Therefore, there are demands for fiber-reinforced thermoplastic resin (hereinafter, referred to also as "FRTP") in which thermoplastic resin, which is easily moldable, is used in place of thermosetting resin.

As a method for molding FRTP, stamping molding is commonly performed in which sheets called prepregs made of continuous fibers impregnated with a thermoplastic resin are stacked one upon another and heat and pressure are applied to the stack with a press or the like to give the stack a desired shape. Because of the use of continuous fibers, members obtained in this manner can be designed to have good dynamic properties and can exhibit less variations in dynamic properties. However, because of the use of continuous fibers, FRTP is difficult to form into a complicated shape, such as a three-dimensional shape, and is limited mainly to the use for members having a flat shape or shapes like that. To cope with this, Patent Literature 1 proposes that, by making incisions in prepregs made of continuous fibers and a thermoplastic resin, the prepregs can be molded in a short time, exhibit good shapability during molding, and can develop good dynamic properties when produced as an FRTP member. Patent Literature 2 proposes the use of prepregs containing non-continuous fibers and thermoplastic fibers. However, in Patent Literatures 1 and 2, there arises a problem that when prepregs are stacked to produce an FRTP, a laminated base material sticks to a belt or a mold of a molding machine, which prevents stable production of an FRTP member.

The use of a mold release agent is known as a method for preventing the sticking of material to the mold of a molding machine, but the transfer of the mold release agent to the surface of an FRTP member may deteriorate the surface quality (cause poor appearance) To avoid this, a release film may be used. However, the use of a release film interferes with heat conduction from the heated or cooled mold to the laminated base material. If the heat conduction from the meld to the laminated base material is interfered with, melting or solidification by cooling of the thermoplastic resin becomes insufficient, so that the resultant FRTP member has low mechanical properties, including strength and rigidity. If, in order to solve this problem, the temperature of the mold is excessively increased or decreased, the mold repeats contraction and expansion and, in turn, may be damaged. Then, an FRTP member having good surface appearance and excellent quality cannot stably be produced.

FRTP members for motor vehicle exterior parts are members depending largely on visual impressions and feelings of users and, therefore, an FRTP member having a poor surface quality significantly reduces its commercial value. For this reason, FRTP members for motor vehicle exterior parts are required to have not only good rigidity and moldability but also good surface appearance. As solutions. Patent Literature 3 proposes to limit the thickness of a release film to not more than 10 times the thickness of a prepreg or use plates treated with a mold release agent.

CITATION LIST

Patent Literature

Patent Literature 1: JP-A-2009-286817
Patent Literature 2: JP-A-2010-235779
Patent Literature 3: JP-A-2015-51629

SUMMARY OF INVENTION

Technical Problem

However, Patent Literature 3 does not propose any technique for stably producing an FRTP member having good surface appearance and good quality, without a technique of using a release film or the like.

An object of the present, invention is to provide: a composite laminate having excellent releasability from a mold during a production process and having excellent surface appearance (surface smoothness); and a method for producing the composite laminate.

Solution to Problem

The present invention provides the following composite laminate and method for producing the same.

Aspect 1: A composite laminate including an A layer and a B layer, the A layer being provided on one or both sides of the B layer, the A layer containing inorganic fibers (a1) with an average fiber length of 1 μm to 300 μm and a thermoplastic resin (a2), the B layer containing reinforcing fibers (b1) with an average fiber length of 1 mm or more and a thermoplastic resin (b2).

Aspect 2: The composite laminate according to aspect 1, wherein the inorganic fibers (a1) have an average aspect ratio of 3 to 200.

Aspect 3: The composite laminate according to aspect 1 or 2, wherein the inorganic fibers (a1) are at least one selected from the group consisting of potassium titanate and wollastonite.

Aspect 4: The composite laminate according to any one of aspects 1 to 3, wherein a content of the inorganic fibers (a1) is 1% by mass to 40% by mass in a total amount of 100% by mass of all components contained in the A layer.

Aspect 5: The composite laminate according to any one of aspects 1 to 4, wherein the reinforcing fibers (b1) are at least one selected from the group consisting of carbon fibers, glass fibers, and aramid fibers.

Aspect 6: The composite laminate according to any one of aspects 1 to 5, wherein the reinforcing fibers (b1) have an average fiber diameter of 1 μm to 50 μm.

Aspect 7: The composite laminate according to any one of aspects 1 to 6, wherein a content of the reinforcing fibers (b1) is 10% by mass to 80% by mass Ln a total amount of 100% by mass of all components contained in the B layer.

Aspect 8: The composite laminate according to any one of aspects 1 to 7, wherein the thermoplastic resin (a2) is at least one selected from the group consisting of polyolefin resin, polystyrene-based resin, polyester-based resin, aliphatic polyamide (PA) resin, semi-aromatic polyamide (PA) resin, polyphenylene sulfide (PPS) resin, aromatic polyether ketone resin, polyetherimide (PEI) resin, and thermoplastic polyimide (TPI) resin.

Aspect 9: The composite laminate according to any one of aspects 1 to 8, wherein the thermoplastic resin (b2) is at least one selected from the group consisting of polyolefin resin, polystyrene-based resin, polyester-based resin, aliphatic polyamide (PA) resin, semi-aromatic polyamide (PA) resin. polyphenylene sulfide (PPS) resin, aromatic polyether ketone resin, polyetherimide (PEI) resin, and thermoplastic polyimide (TPI) resin.

Aspect 10: The composite laminate according to any one of aspects 1 to 9, wherein a maximum height (Sz) of a surface of the A layer is 50 μm or less.

Aspect 11: The composite laminate according to any one of aspects 1 to 10, being used for motor vehicle members.

Aspect 12: A method for producing the composite laminate according to any one of aspects 1 to 11, the method including: disposing a film (a3) containing inorganic fibers (a1) with an average fiber length of 1 μm to 300 μm and a thermoplastic resin (a2) on one or both sides of a sheet (b3) containing reinforcing fibers (b1) with an average fiber length of 1 mm or more and a thermoplastic resin (b2) to form a stack; and applying heat and pressure to the stack to integrate the sheet (b3) and the film (a3).

Aspect 13: The method for producing the composite laminate according to aspect 12, wherein the film (a3) has a thickness of less than 500 μm.

Aspect 14: The method for producing the composite laminate according to aspect 12 or 13, wherein the sheet (b3) has a thickness of 0.3 mm to 15 mm.

Advantageous Effects of Invention

The present invention enables provision of: a composite laminate having excellent releasability from a mold during a production process and having excellent surface appearance (surface smoothness); and a method for producing the composite laminate.

DESCRIPTION OF EMBODIMENTS

Hereinafter, a description will be given of preferred embodiments. However, the following embodiments are merely illustrative and the present invention is not limited to the following embodiments. Throughout the drawings, members having substantially the same functions may be referred to by the same reference numerals.

A composite laminate according to the present invention is a composite laminate including: an A layer containing inorganic fibers (a1) with an average fiber length of 1 μm to 300 μm and a thermoplastic resin (a2); and a B layer containing reinforcing fibers (b1) with an average fiber length of 1 mm or more and a thermoplastic resin (b2).

Figure 1:
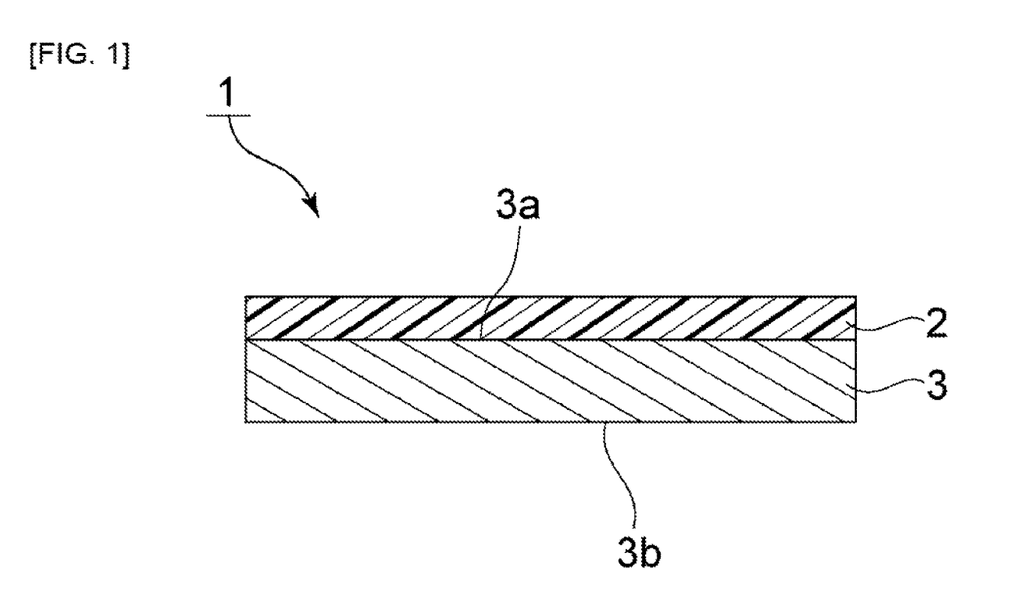
FIG. 1 is a schematic cross-sectional view showing a composite laminate according to a first embodiment of the present invention.

More specifically, FIG. 1 is a schematic cross-sectional view showing a composite laminate according to a first embodiment of the present invention. As shown in FIG. 1, the composite laminate 1 includes an A layer 2 as a first layer and a B layer 3 as a second layer. The B layer 3 has a first principal surface 3a and a second principal surface 3b opposed to each other. The A layer 2 is provided on the first principal surface 3a of the B layer 3. The A layer 2 contains: inorganic fibers (a1) having an average fiber length of 1 μm to 300 μm; and a thermoplastic resin (a2). The B layer 3 contains: reinforcing fibers (b1) having an average fiber length of 1 mm or more; and a thermoplastic resin (b2).

Figure 2:
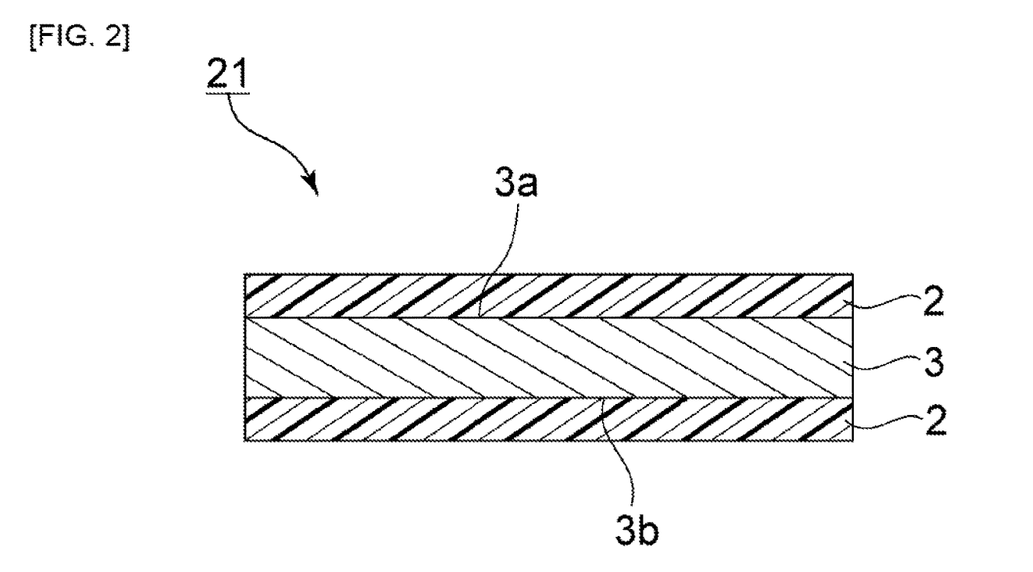
FIG. 2 is a schematic cross-sectional view showing a composite laminate according to a second embodiment of the present invention.

FIG. 2 is a schematic cross-sectional view showing a composite laminate according to a second embodiment of the present invention. As shown in FIG. 2, in the composite laminate 21, an A layer 2 is further provided on the second principal surface 3b of the B layer 3. For the rest, the composite laminate 21 is the same as that according to the first embodiment.

As shown in the first embodiment and the second embodiment, in the composite laminate according to the present invention, the A layer may be provided only on one side of the B layer or may be provided on both sides of the B layer.

A description will be given below of components and so on of the composite laminate according to the present invention.

<A Layer>

The A layer forming a component of the composite laminate according to the present invention is a layer containing inorganic fibers (a1) with an average fiber length of 1 μm to 300 μm and a thermoplastic resin (a2), and the A layer exists on one or both sides of the B layer to be described hereinafter, since the A layer exists as a front layer, a back layer or front and back layers of the composite laminate, the composite laminate has excellent releasability during molding and the front surface of the composite laminate has excellent surface smoothness.

The thickness of the A layer is preferably smaller than the thickness of the B layer, more preferably less than 500 μm, still more preferably 50 μm to 450 μm, particularly preferably 50 μm to 250 μm, and most preferably 50 μm to 100 μm. If the thickness of the A layer is too large, the content of reinforcing fibers in the composite laminate decreases, so that the strength may decrease. In contrast, since the thickness of the A layer is smaller than the thickness of the B layer, the dynamic properties of the B layer can be maximized, so that a composite laminate having more excellent dynamic properties can be obtained. Note that the thickness of the a layer in the case where the A layers exist on both sides of the B layer refers to a total of the thicknesses of both the A layers.

(Inorganic Fibers (a1))

The inorganic fibers (a1) for use in the A layer is a powder formed of fibrous particles and their average fiber length is 1 μm to 300 μm, preferably 1 μm to 200 μm, more preferably 3 μm to 100 μm, and still more preferably 5 μm to 50 μm.

The average aspect ratio of the inorganic fibers (a1) is preferably 3 to 200, more preferably 3 to 100, still more preferably 5 to 50, and particularly preferably 10 to 40.

The inorganic fibers (a1) for use in the present invention preferably have a Mohs hardness of 5 or less in view of sliding properties of the composite laminate and examples include potassium titanate, wollastonite, aluminum borate, magnesium borate, xonotlite, zinc oxide, and basic magnesium sulfate. From the viewpoint of mechanical properties of them, the inorganic fibers (a1) is preferably at least one selected from the group consisting of potassium titanate and wollastonite. The Mohs hardness is an index indicating the hardness of substances, wherein when two different minerals are rubbed against each other, scratched one of them is a substance having a lower hardness.

Heretofore known potassium titanates can be widely used and examples include potassium tetratitanate, potassium hexatitanate, and potassium octatitanate. There is no particular limitation as to the dimensions of potassium titanate so long as they are within the above-described ranges of dimensions of the inorganic fibers. However, its average fiber diameter is preferably 0.01 µm to 1 µm, more preferably 0.05 µm to 0.8 µm, and still more preferably 0.1 µm to 0.7 µm, its average fiber length is preferably 1 µm to 50 µm, more preferably 3 µm to 30 µm, and still more preferably 10 µm to 20 µm, and its average aspect ratio is preferably 10 or more, more preferably 10 to 100, and still more preferably 15 to 35. In the present invention, even marketed products can be used and examples that can be used include "TISMO D" (average fiber length: 15 µm, average fiber diameter: 0.5 µm) and "TISMO N" (average fiber length: 15 µm, average fiber diameter: 0.5 µm) both manufactured by Otsuka Chemical Co., Ltd.

Wollastonite is inorganic fibers made of calcium metasilicate. There is no particular limitation as to the dimensions of wollastonite so long as they are within the above-described ranges of dimensions of the inorganic fibers. However, its average fiber diameter is preferably 0.1 µm to 15 µm, more preferably 1 µm to 10 µm, and still more preferably 2 µm to 7 µm, its average fiber length is preferably 3 µm to 130 µm, more preferably 10 µm to 100 µm, and still more preferably 20 µm to 40 µm, and its average aspect ratio is preferably 3 or more, more preferably 3 to 30, and still more preferably 5 to 15. In the present invention, even marketed products can be used and an example that can be used is "Bistal W" (average fiber length: 25 µm, average fiber diameter: 3 µm) manufactured by Otsuka Chemical Co., Ltd.

The above average fiber length and average fiber diameter can be measured by observation with a scanning electron microscope, and the average aspect ratio (average fiber length/average fiber diameter) can be calculated from the average fiber length and the average fiber diameter. For example, a plurality of inorganic fibers are taken with a scanning electron microscope, the images of 300 inorganic fibers are arbitrarily selected from the observed images of the plurality of inorganic fibers, and their fiber lengths and fiber diameters are measured. The average fiber length can be determined by dividing the sum of all the measured fiber diameters by the number of fibers, and the average fiber diameter can be determined by dividing the sum of all the measured fiber diameters by the number of fibers.

Fibrous particles as used in the present invention means particles having an L/B of 3 or more and an L/T of 3 or more where a length L represents the dimension of the longest side of, among cuboids (circumscribing cuboils) circumscribing the particle, a cuboid having the minimum volume, a breadth B represents the dimension of the second longest side of the cuboid, and a thickness T (B>T) represents the dimension of the shortest side of the cuboid. The length L and the breadth B correspond to the fiber length and the fiber diameter, respectively. Non-fibrous particles are particles having an L/B smaller than 3 and platy particles are non-fibrous particles having an L/B smaller than 3 and an L/T of 3 or more.

Regarding the inorganic fibers, in order to increase the wettability with the thermoplastic resin and further improve physical properties, such as mechanical properties, of an obtained resin composition, treated layers made of a surface treatment agent may be formed on the surfaces of inorganic fibers for use in the present invention.

Examples of the surface treatment, agent include silane coupling agents and titanium coupling agents. Preferred among them are silane coupling agents and more preferred are aminosilane coupling agents, epoxysilane coupling agents, and alkylsilane coupling agents. These surface treatment agents may be used alone or as a mixture of two or more thereof.

Examples of the aminosilane coupling agents include N-2-(aminoethyl)-3-aminopropylmethyldimethoxysilane, N-2-(aminoethyl)-3-aminopropyltrimethoxysilane, 3-aminopropyitrimethoxysilane, 3-aminopropyltriethoxysilane, 3-ethoxysilyl-N-(1,3-dimethyibutylidene)propylamine, N-phenyl-3-aminopropyltrimethoxysilane, and N-(vinylbenzyl)-2-aminoethyl-3-aminopropyltrimethoxysilane.

Examples of the epoxysilane coupling agents include 3-glycidyloxypropyl(dimethoxy)methylsilane, 3-glycidyloxypropyltrimet.hoxysilane, diethoxy(3-glycidyloxypropyl)methylsilane, triethoxy(3-glyciraylaoxypropyl)silane, and 2-(3,4-epoxycyclohezyl)ethyltriraethoxysilane.

Examples of the alkylsilane coupling agents include methyltrimethoxysilane, dimethyldimethoxysilane, trimethylmethoxysilane, methyltriethoxysilane, ethyltrimethoxysilane, n-propyltrimethoxysilane, isobutyltrimethoxysilane, isobutyltriethoxysilane, n-hexyltrimethoxysilane, n-hexyltriethoxysilane, cyclchexylmethyldimethexysilane, n-octyltriethoxysilane, and n-decyltrimethoxysilane.

Known surface treatment methods can be used as the method for forming treated layers made of a surface treatment agent on the surfaces of the inorganic fibers and examples include: a wet method of dissolving the surface treatment agent in a solvent promoting hydrolysis (for example, water, an alcohol or a mixed solvent of them) to prepare a solution and spraying the solution on the inorganic fibers; and an integral blend method of blending the inorganic fibers and the surface treatment agent with a resin composition.

There is no particular limitation as to the amount of surface treatment agent in treating the surfaces of the inorganic fibers for use in the present invention with the surface treatment agent, but, in the case of the wet method, the solution of the surface treatment agent may be sprayed so that the amount of surface treatment agent reaches, for example, 0.1 parts by mass to 20 parts by mass relative to 100 parts by mass of inorganic fibers. On the other hand, in the case of the integral blend method, the surface treatment agent may be blended with the resin composition so that the amount of surface treatment agent reaches preferably 1 part by mass to 50 parts by mass and more preferably 10 parts by mass to 40 parts by mass, relative to 100 parts by mass of inorganic fibers. When the amount of surface treatment agent is within the above ranges, the adhesion of the inorganic fibers (a1) to the thermoplastic resin (a2) can be further increased and the dispersibility of the inorganic fibers (a1) can be further increased.

The content of the inorganic fibers (a1) is, in a total amount of 100% by mass of all components contained in the A layer, preferably 1% by mass to 40% by mass, more preferably 3% by mass to 30% by mass, and still more preferably 5% by mass to 20% by mass.

When the content of the inorganic fibers (a1) is not less than 1% by mass, the surface smoothness of the composite laminate can be further increased. When the content of the inorganic fibers (a1) is not more than 40% by mass, the formability of a film to be described hereinafter can be further increased.

(Thermoplastic Resin (a2))

There is no particular limitation as to the type of the thermoplastic resin (a2) for use in the A layer so long as it is a thermoplastic resin that can be formed into a film. Examples include: polyolefin resins, such as polypropylene (PP) resin, polyethylene (PE) resin, cyclic polyolefin (COP) resin, and cyclic olefin copolymer (COC) resin; polystyrene-based resins, such as polystyrene (PS) resin, syndiotactic polystyrene (SPS) resin, high-impact polystyrene (HIPS) resin, acrylonitrile-butylene-styrene copolymer (ABS) resin, methyl methacrylate-styrene copolymer (MS), methyl methacrylate-styrene-butadiene copolymer (MBS), styrene-butadiene copolymer (SBR), styrene-isoprene copolymer (SIR), styrene-isoprene-butadiene copolymer (SIBR), styrene-butadiene-styrene copolymer (SBS), styrene-isoprene-styrene copolymer (SIS), styrene-ethylene-butylene-styrene copolymer (sebs), and styrene-ethylene-propylene-styrene copolymer (SEPS); polyester-based resins, such as polylactic (PLA) resin, polyethylene terephthalate (PET) resin, polybutylene terephthalate (PBT) resin, and polycyclohexylenedimethylene terephthalate (PCT) resin; polyacetal (POM) resin; polycarbonate (PC) resin; aliphatic polyamide (PA) resins, such as polyamide 6 resin, polyamide 66 resin, polyamide 11 resin, polyamide 12 resin, polyamide 46 resin, polyamide 6C resin, polyamide 9C resin, polyamide 6 resin-polyamide 66 resin copolymer (polyamide 6/66 resin), and polyamide 6 resin-polyamide 12 resin copolymer (polyamide 6/12 resin); semi-aromatic polyamide (PA) resins composed of a structural unit with an aromatic ring and a structural unit free from aromatic ring, such as polyamide MXD6 resin, polyamide MXD10 resin, polyamide 6T resin, polyamide 9T resin, and polyamide 10T resin; polyphenylene sulfide (PPS) resin; polyether sulfone (PES) resin; liquid crystal polyester (LCP) resin; aromatic polyether ketone resins, such as polyether ketone (PEK) resin, polyether ether ketone (PEEK) resin, polyether ketone ketone (PEKK) resin, and polyether ether ketone ketone (PEEKK) resin; polyether imide (PEI) resin; polyamide-imide (PAI) resin; thermoplastic polyimide (TPI) resin; and fluororesins, such as polyvinylidene fluoride (PVDF), polyvinyl fluoride (PVF), and ethylene-tetrafluoroethylene copolymer (ETFE). Preferred among them is at least one selected from the group consisting of polyolefin resin, polystyrene-based resin, polyester-based resin, aliphatic polyamide (PA) resin, semi-aromatic polyamide (PA) resin, polyphenylene sulfide (PPS) resin, aromatic polyether ketone resin, polyether imide (PET) resin, and thermoplastic polyimide (TPI) resin.

Mixtures of at least two compatible thermoplastic resins selected from among the above thermoplastic resins, i.e., polymer alloys, or the like can also be used.

In view of further increasing the adhesion to the B layer, the thermoplastic resin (a2) is preferably of the same type as the thermoplastic resin (b2) to be described hereinafter. For example, when the thermoplastic resin (b2) is aliphatic polyamide (FA), the thermoplastic resin (a2) is preferably aliphatic polyamide (PA) resin or semi-aromatic polyamide (PA).

There is no particular limitation as to the form of the thermoplastic resin (a2) so long as it can be melt-kneaded. For example, any one of powdered, granular, and pelletized forms can be used.

The content of the thermoplastic resin (a2) is, in a total amount of 100% by mass of all components contained in the A layer, preferably 60% by mass to 59% by mass, more preferably 70% by mass to 97% by mass, and still more preferably 80% by mass to 95% by mass.

(Other Additives)

The A layer may contain other additives without impairing its preferred physical properties. Examples of the other additives include: an inorganic filler other than the above-mentioned inorganic fibers (a1), such as aramid fibers, polyphenylene benzoxazole (PBO) fibers, glass fibers, carbon fibers, alumina fibers, boron fibers, silicon carbide fibers, calcium carbonate, mica, sericite, illite, talc, kaolinite, montmorilonite, fcoehmite, smectite, vermiculite, titanium dioxide, silica, potassium titanate, potassium lithium titanate, boehmite, glass beads or alumina; a solid lubricant, such as polytetrafluoroethylene (PTFE), low-density polyethylene, linear low-density polyethylene, medium density polyethylene, high-density polyethylene, ultra-high molecular weight, polyethylene or other polyolefin resins, graphite, molybdenum disulfide, tungsten disulfide or boron nitride; a thermal stabilizer, such as copper compounds; a light stabilizer, such as hindered phenol-based light stabilizer; a nucleating agent; an antistat, such as anionic antistat, cationic antistat or non-ionic antistat; an anti-aging agent (antioxidant); a weatherproofer; a light-resistant agent; a metal deactivator; a ultraviolet ray absorber, such as benzophenone-based ultraviolet ray absorber, benzotriazole-based ultraviolet ray absorber, triazine-based ultraviolet ray absorber or salicvlate-based ultraviolet ray absorber; a germ- and mildew-proofing agent; a deodorant; a conductive additive, such as carbon-based conductive additive, metal-based conductive additive, metal oxide-based conductive additive or surfactant; a dispersant; a softener (plasticizer), such as polyester-based plasticizer, glycerin-based plasticizer, polycarboxylic acid ester-based plasticizer, phosphoric acid ester-based plasticizer, polyalkylene glycol-based plasticizer or epoxy-based plasticizer; a colorant, such as carbon black, titanium oxide or other pigments, or dye; a flame retardant, such as phosphazene-based compound, phosphoric acid ester, condensed phosphoric acid ester, inorganic phosphorous flame retardant, halogen-based flame retardant, silicone-based flame retardant, metal oxide-based flame retardant, metal hydroxide-based flame retardant, organometallic salt-based flame retardant, nitrogen-based flame retardant or boron compound-based flame retardant; an antidripping agent; a sound deadener; a neutralizer; an antiblocking agent; a flow modifier; a mold release agent, such as fatty acid or metal salt of fatty acid; a lubricant, and an impact resistance improver. The A layer may contain at least one of these additives.

When the A layer contains the other additives, the content of them is not particularly limited without impairing the preferred physical properties of the present invention and is, in a total amount of 100% by mass of all components contained in the A layer, preferably 5% by mass or less, and more preferably 1% by mass or less.

(Method for Producing A Layer)

The composite laminate according to the present invention can be obtained, as will be described hereinafter, by producing each of a film (a3) forming the A layer and a sheet (b3) forming the B layer, disposing the film (a3) on one or both sides of the sheet (b3) to form a stack, and applying heat and pressure to the obtained stack with a molding machine to integrate the film (a3) and the sheet (b3).

There is no particular limitation as to the method for producing the film (a3) forming the A layer. For example, known melting and film formation methods, such as T-die casting, calendering, and pressing, can be used.

More specifically, examples include: a method of directly mixing the inorganic fibers (a1), the thermoplastic resin (a2), and, if necessary, other additives to give the above respective contents and melting them to form a film; and a method of previously melt-kneading the inorganic fibers (a1), the thermoplastic resin (a2), and, if necessary, other additives to give the above respective contents, thus forming pellets of the mixture, and melting the pellets to form a film.

Either a stretched film or an unstretched film may be used as the film (3a), but the stretched film is preferred because its contraction during melting by the application of heat prevents the occurrence of wrinkling and loosing to further improve the appearance of a molded article. The stretch ratio is preferably 2 to 15. The stretch ratio in the present invention refers to the area ratio obtained by multiplying, with reference to the dimensions of a film exiting from a casting roll during film formation, its horizontal stretch ratio by its vertical stretch ratio.

The thickness of the film (a3) forming the A layer before the production of the composite laminate according to the present invention is preferably less than 500 μm, more preferably 50 μm to 450 μm, and still more preferably 50 μm to 250 μm. When the thickness of the film (a3) forming the A layer is less than 500 μm, the surface smoothness of the composite laminate obtained by stamping molding can be further increased without impairing the dynamic properties of the composite laminate.

<b Layer>

The B layer forming a component of the composite laminate according to the present invention is a layer containing reinforcing fibers (b1) with an average fiber length of 1 mm or more and a thermoplastic resin (b2), and the B layer is a core layer of the composite laminate. When the average fiber length of the reinforcing fibers (b1) is 1 mm or more, a composite laminate having excellent dynamic properties can be obtained.

The thickness of the B layer can be arbitrarily selected depending on the shape of a desired member and, in view of dynamic properties, preferably 0.3 mm to 15 mm and more preferably 1 mm to 12 mm.

(Reinforcing Fibers (b1))

There is no particular limitation as to the type of the reinforcing fibers (b1) for use in the B layer so long as their average fiber length is 1 mm or more, and examples that can be used include inorganic fibers, organic fibers, metallic fibers or any combination of two or more of these types of fibers. Examples of the inorganic fibers include carbon fibers, graphite fibers, silicon carbide fibers, alumina fibers, tungsten carbide fibers, boron fibers, and glass fibers. Examples of the organic fibers include aramid fibers, polyparaphenylene benzoxazole (PBO) fibers, high-density polyethylene fibers, other types of common polyamide fibers, and polyester. Examples of the metallic fibers include stainless fibers and iron fibers and metal-coated carbon fibers may also be used. Preferred among them is at least one selected from the group consisting of carbon fibers, glass fibers, and aramid fibers. From the viewpoint of further increasing the dynamic properties, such as strength, of a final molded product, carbon fibers are more preferred. Examples of the type of carbon fibers include pitch-based carbon fibers and PAN-based carbon fibers.

The average fiber diameter of the reinforcing fibers (b1) is preferably 1 μm to 50 μm and more preferably 5 μm to 20 μm. The reinforcing fibers may be in the form of bundles bundled with a sizing agent or the like so long as they have the above-mentioned average fiber diameter.

Regarding the reinforcing fibers (b1), an excessively long fiber length may decrease the fluidity during stamping molding, whereas an excessively short fiber length may make it difficult to skim the reinforcing fibers. Therefore, from the viewpoint of further increasing moldability, their average fiber length is preferably 1 mm to 100 mm and more preferably 2 mm to 50 mm.

The content of the reinforcing fibers (b1) is, in a total amount of 100% by mass of all components contained in the B layer, preferably 10% by mass to 80% by mass, more preferably 20% by mass to 70% by mass, and still more preferably 30% by mass to 60% by mass.

When the content of the reinforcing fibers (b1) is not less than 10% by mass, a further reinforcing effect of the fibers can be obtained. When the content of the reinforcing fibers (b1) is not more than 80% by mass, the productivity of a sheet to be described hereinafter can be further increased.

(Thermoplastic Resin (b2))

There is no particular limitation as to the type of the thermoplastic resin (b2) for use in the B layer so long as it can be used as a binder resin for a prepreg. Examples include: polyolefin resins, such as polypropylene (PP) resin, polyethylene (PE) resin, cyclic polyolefin (COP) resin, and cyclic olefin copolymer (COC) resin; polystyrene-based resins, such as polystyrene (PS) resin, syndiotactic polystyrene (SPS) resin, high-impact polystyrene (HIPS) resin, acrylonitrile-butylene-styrene copolymer (ABS) resin, methyl methacrylate-styrene copolymer (MS), methyl methacrylate-styrene-butadiene copolymer (MBS), styrene-butadiene copolymer (SBR), styrene-isoprene copolymer (SIR), styrene-isoprene-butadiene copolymer (SIBR), styrene-butadiene-styrene copolymer (SBS), styrene-isoprene-styrene copolymer (SIS), styrene-ethylene-butylene-styrene copolymer (SEBS), and styrene-ethylene-propylene-styrene copolymer (SEPS); polyester-based resins, such as polylactic (PLA) resin, polyethylene terephthalate (PET) resin, polybutylene terephthalate (PBT) resin, and polycyclohexylenedimethylene terephthalate (PCT) resin; polyacetal (POM) resin; polycarbonate (PC) resin; aliphatic polyamide (PA) resins, such as polyamide 6 resin, polyamide 66 resin, polyamide 11 resin, polyamide 12 resin, polyamide 46 resin, polyamide 6C resin, polyamide 9C resin, polyamide 6 resin-polyamide 66 resin copolymer (polyamide 6/66 resin), and polyamide 6 resin-polyamide 12 resin copolymer (polyamide 6/12 resin); semi-aromatic polyamide (PA) resins composed of a structural unit with an aromatic ring and a structural unit free from aromatic ring, such as polyamide MXD6 resin, polyamide MXD10 resin, polyamide 6T resin, polyamide 9T resin, and polyamide 10T resin; polyphenylene sulfide (PPS) resin; polyether sulfone (PES) resin; liquid crystal polyester (LCP) resin; aromatic polyether ketone resins, such as polyether ketone (PEK) resin, polyether ether ketone (PEEK) resin, polyether ketone ketone (PEKK) resin, and polyether ether ketone ketone (PEEKK) resin; polyether imide (PEI) resin; polyamide-imide (PAI) resin; thermoplastic polyimide (TPI) resin; and fluororesins, such as polyvinylidene fluoride (PVDF), polyvinyl fluoride (PVF), and ethylene-tetrafluoroethylene copolymer (ETFE). Preferred among them is at least one selected from the group consisting of polyolefin resin, polystyrene-based resin, polyester-based resin, aliphatic polyamide (PA) resin, semi-aromatic polyamide (PA) resin, aromatic polyether ketone resin, polyether imide (PEI) resin, and thermoplastic polyimide (TPI) resin.

Mixtures of at least two compatible thermoplastic resins selected from among the above thermoplastic resins, i.e., polymer alloys, or the like can also be used.

There is no particular limitation as to the form of the thermoplastic resin (b2) so long as it can be melt-kneaded. For example, any one of powdered, granular, and pelletized forms can be used.

The content of the thermoplastic resin (b2) is, in a total amount of 100% by mass of all components contained in the B layer, preferably 20% by mass to 90% by mass, more preferably 30% by mass to 80% by mass, and still more preferably 40% by mass to 70% by mass.

(Method for Producing B Layer)

The composite laminate according to the present invention can be obtained by producing each of a film (a3) forming the A layer and a sheet (b3) forming the B layer, disposing the film (a3) on one or both sides of the sheet (b3) to form a stack, and applying heat and pressure to the obtained stack with a molding machine to integrate the film (a3) and the sheet (b3).

The sheet (b3) forming the B layer can be obtained by stacking a plurality of prepregs made of the reinforcing fibers (b1) impregnated with the thermoplastic resin (b2) to give the above-mentioned respective contents, thus forming a stack, and applying heat and pressure to the obtained stack with a molding machine to integrate the prepregs. Alternatively, prepregs made of the reinforcing fibers (b1) impregnated with the thermoplastic resin (b2) may be used as they are. In other words, prepregs made of the reinforcing fibers (b1) impregnated with the thermoplastic resin (b2) may be used directly as the sheet (b3).

An example of a method fur producing a prepreg is a method of preparing two sheets of thermoplastic resin (b2), such as films, pieces of non-woven fabric, mats, pieces of woven fabric or pieces of knit fabric, sandwiching between the two sheets a sheet made of reinforcing fibers (b1) aligned in a sheet form or a sheet obtained by cutting the reinforcing fibers (b2) and making them into a sheet (non-woven material) by a paper making method, and applying heat and pressure to the stacked sheets. More specifically, while two sheets of thermoplastic resin are fed from two rolls feeding different sheets of thermoplastic resin, a single sheet of reinforcing fibers fed from a roll for a sheet of reinforcing fibers is inserted between the two sheets of thermoplastic resin. Thereafter, heat and pressure are applied to the stack of the sheets. Any known apparatus for applying heat and pressure can be used and apparatuses requiring multiple stages may also be used, such as an apparatus using two or more hot rolls or an apparatus using a plurality of pairs of a preheating device and a hot roll. The thermoplastic resin forming each sheet may not necessarily be of a single type. One or more sheets of different types of thermoplastic resin may be further stacked using such an apparatus as described above.

The temperature of heat applied is, depending on the type of the thermoplastic resin (b2), normally preferably 100° C. to 400° C. The pressure applied is normally preferably 0.1 MPa to 10 MPa. when the temperature and pressure applied are within the above ranges, this is preferred because the thermoplastic resin (b2) can further penetrate between the reinforcing fibers (b1) contained in the prepreg.

Regarding the prepreg containing the reinforcing fibers (b1) and the thermoplastic resin (b2), when the reinforcing fibers (b1) are continuous fibers oriented in a single direction, the prepreg that can be used for the composite laminate according to the present invention is preferably obtained by making incisions therein with a laser marker, a cutting plotter, a punching die or the like. The reinforcing fibers (b1) are cut by making the incisions, in which case, in view of dynamic properties and fluidity, the length of cut reinforcing fibers (b1) is preferably 5 mm to 100 mm and more preferably 10 mm to 50 mm.

A laminated base material may be made by stacking the two or more prepregs obtained in the above manner so that the directions of the reinforcing fibers (b1) are quasi-isotropic or alternated. The laminated base material is preferably obtained by stacking the prepregs in 4 to 96 layers. The more preferred range of prepreg layers is 8 to 32. The above range is preferred because eight or more prepreg layers enable provision of a stack in which the directions of reinforcing fibers are quasi-isotropic and because thirty-two or less prepreg layers enable further reduction in workload in the stacking process.

The sheet (b3) may be produced by applying heat and pressure to the laminated base material obtained in the above manner to mold an integrated laminated base material. In doing so, when the film (a3) is disposed between the laminated base material and the mold of a press, a composite laminate according to the present invention can be produced concurrently with the production of the sheet (b3). After the heat application process, a cooling process is preferably performed. By the cooling, the thermoplastic resin is solidified, so that the sheet (b3) can be more easily handled.

During the application of heat, the laminated base material is heated, depending on the type of the thermoplastic resin (b2) contained in the prepregs, preferably at 100° C. to 400° C. and more preferably at 150° C. to 350° C. In addition, prior to the application of heat, preheating may be performed. The preheating is normally performed at 150° C. to 400° C. and preferably at 200° C. to 380° C.

The pressure applied to the laminated base material during the above application of pressure is preferably 0.1 MPa to 10 MPa and more preferably 0.2 MPa to 2 MPa. Each of these values of the pressure is a value obtained by dividing the pressing force by the area of the laminated base material.

The time of application of heat and pressure is preferably 0.1 minutes to 30 minutes and more preferably 0.5 minutes to 20 minutes. The time of cooling 3et after the application of heat and pressure is preferably 0.5 minutes to 30 minutes.

The thickness of the sheet (b3) integrally formed by the above molding can be arbitrarily selected depending on the shape of a desired member and, from the viewpoint of moldability and dynamic properties, is preferably 0.3 mm to 15 mm and more preferably 1 mm to 12 mm.

<Method for Producing Composite Laminate>

The composite laminate according to the present invention can be produced by disposing the film (a3) on one or both sides of the sheet (b3) to form a stack so that the film (a3) is disposed between the sheet (b3) and the mold, and applying heat and pressure to the obtained stack with a molding machine to integrate the film (a3) and the sheet (b3). Alternatively, two or more (preferably, two to five) films (a3) may be disposed on one or both sides of the sheet (b3) to form a stack. After the heat application process, a cooling process is preferably performed. By the cooling, the thermoplastic resin is solidified, so that the composite laminate can be easily handled.

During the application of heat to the stack, the stack is heated, depending on the type of the thermoplastic resin (a2) contained in the film (a3) and the type of the thermoplastic resin (b2) contained in the sheet (b3), preferably at 100° C. to 400° C. and more preferably at 150° C. to 350° C. In addition, prior to the application of heat, preheating may be performed. The preheating is normally performed at 150° C. to 400° C. and preferably at 200° C. to 380° C.

The pressure applied to the stack during the above application of pressure is preferably 0.1 MPa to 10 MPa and more preferably 0.2 MPa to 2 MPa. Each of these values of the pressure is a value obtained by dividing the pressing force by the area of the stack.

The time of application of heat and pressure is preferably 0.1 minutes to 30 minutes and more preferably 0.5 minutes to 20 minutes. The time of cooling set after the application of heat and pressure is preferably 0.5 minutes to 30 minutes.

The m0ld temperature (Th) of the molding machine during the application of heat is, if the thermoplastic resin contained in the stack has a melting point (Tm), preferably $Tm \leq Th \leq (Tm+100)$ (° C.) and more preferably $(Tm+10) \leq Th \leq (Tm+80)$ (° C.). The mold temperature (Th) of the molding machine during the application of heat is, if the thermoplastic resin contained in the stack has no melting point (Tm) but has a glass transition temperature (Tg), preferably $Tg \leq Th \leq (Tg+100)$ (° C.) and more preferably $(Tg+10) \leq Th \leq (Tg+80)$ (° C.). When the mold temperature (Th) of the molding machine is within the above range, the stack can be integrated while the expansion of the mold can be prevented and the deterioration of the resin can be reduced.

The difference (Th−Tc) between the mold temperature (Th) of the molding machine during application of heat and the mold temperature (Tc) thereof during cooling of the stack is preferably $10 \leq (Th-Tc) \leq 250$ (° C.) and more preferably $30 \leq (Th-Tc) \leq 200$ (° C.). When the difference between both the mold temperatures is within the above range, the thermoplastic resin can be more evenly melted and solidified, so that the obtained composite laminate can be further increased in durability.

In the composite laminate according to the present invention, large sizes of the reinforcing fibers (b1) may cause the B layer to develop sink marks in the thermoplastic resin (b2), but it can be considered that the formation of the A layer containing the inorganic fibers (a1) on the surface of the B layer allows the inorganic fibers (a1) to fill and microreinforce the gaps between the reinforcing fibers (b1), thus increasing the surface smoothness. It can also be considered that the existence of the inorganic fibers (a1) in the A layer increases the nucleating effect of the inorganic fibers (a1) on the thermoplastic resin (a2), reduces the sticking to the mold, and increases the high-temperature rigidity to thereby increase the mold releasability. Furthermore, it can be considered that the tanglement (anchoring effect) between the inorganic fibers (a1) in the A layer and the reinforcing fibers (b1) in the B layer increases the adhesion strength between the A layer and the B layer.

In addition, since the composite laminate according to the present invention contains the inorganic fibers (a1) in the A layer, it has an effect that burrs are less likely to be formed on a cut surface of the composite laminate after being subjected to a cutting process. Furthermore, since the composite laminate contains the inorganic fibers (a1), particularly when containing potassium titanate fibers, the existence of hydroxyl groups or the like on the surfaces of the inorganic fibers (a1) increases the adhesion of coating to the composite laminate.

Since, as described previously, the composite laminate according to the present invention can be given an arbitrary shape by press molding, such as stamping molding, the composite laminate can be suitably applied to various parts and members of motor vehicles, electric and electronic devices, home electric appliances, aircraft, and so on.

The composite laminate according to the present invention has excellent surface appearance (surface smoothness) and, for example, the maximum height (Sz) of the surface of the A layer is 50 μm or less. Therefore, the composite laminate can be suitably used for motor vehicle members and can be suitably used particularly for motor vehicle exterior parts. The maximum height (Sz) can be measured in conformity with ISO 25178.

EXAMPLES

Hereinafter, a detailed description will be given of the present invention with reference to working examples and comparative examples, but the present invention is not at all limited to these examples. Specific raw materials used in the working examples and comparative examples are as follows.

(Thermoplastic Resin)

Polyamide 6 resin (trade name: AMILAN CM1017 manufactured by Toray Industries, Inc.)

Polyamide MXD10 resin (trade name: LEXTER 8500 manufactured by Mitsubishi Gas Chemical Company, Inc.)

Thermoplastic polyimide resin (trade name: TherplimTO-65 manufactured by Mitsubishi Gas Chemical Company, Inc.)

(Inorganic Fibers)

Potassium titanate (trade name: TISMO D101 manufactured by Otsuka Chemical Co., Ltd., average fiber length: 15 μm, average fiber diameter: 0.5 μm, average aspect ratio: 30)

Wollastonite (trade name: Bistal W manufactured by Otsuka Chemical Co., Ltd., average fiber length: 25 μm, average fiber diameter: 3 μm, average aspect ratio: 8).

(Others)

Glass fibers (trade name: ECS 03T-289P/W manufactured by Nippon Electric Glass Co., Ltd., average fiber length: 3 mm, average fiber diameter: 13 μm)

Platy talc (trade name: TALC GH7 manufactured by Hayashi Kasei Co., Ltd., average major diameter: 5.8 μm, thickness: 0.1 μm)

Examples 1 to 5 and Comparative Examples 1 to 5

Materials were melt-kneaded in each composition ratio shown in Table 1 using a biaxial extruder, thus producing pellets. The cylinder temperature of the biaxial extruder was 230° C. in Examples 1 and 2 and Comparative Examples 1 to 3, 240° C. in Examples 3 and 4 and Comparative Example 4, and 350° C. in Example 5 and Comparative Example 5.

The obtained pellets were dried, then melted in a film extruder (manufactured by Toyo Seiki Seisaku-sho, Ltd., a connection of LABQ PLASTOMILL 4C150-01 with a uniaxial extruder D2020 (L/D=20)) at a cylinder temperature of 230° C. in Examples 1 and 2 and Comparative Examples 1 to 3, 240° C. in Examples 3 and 4 and Comparative Example 4, and 350° C. in Example 5 and Comparative Example 5, and extruded as a molten resin from a T-die (width: 150 mm, thickness: 0.2 mm), and the extruded molten resin was uniaxially stretched through a film drawer so that a resultant film had a desired thickness, thus obtaining a film (a3). The thickness of the films (a3) in Examples 1 to 5 and Comparative Examples 2 to 5 was set at 100 μm and the thickness of the film (a3) in Comparative Example 1 was set at 250 μm.

TABLE 1

| | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|---|
| Thermoplastic Resin | Polyamide 6 resin (% by mass) | 90 | 90 | | | | 90 | 90 | 100 | | |
| | Polyamide MXD10 resin (% by mass) | | | 85 | 85 | | | | | 100 | |
| | Thermoplastic polyimide resin (% by mass) | | | | | 90 | | | | | 100 |
| Inorganic Fibers | Potassium titanate (% by mass) | | | | | 10 | | | | | |
| | Wollastonite (% by mass) | 10 | | 15 | | 10 | | | | | |
| Others | Glass fibers (% by mass) | | 15 | | 15 | | 10 | | | | |
| | Platy talc (% by mass) | | | | | | | 10 | | | |

(Evaluation of Maximum Height (Sz))

Using each of the above-obtained films (a3) in Examples 1 and 2 and Comparative Examples 1 to 3, the film (a3) and a carbon fiber sheet (sheet thickness: 10 mm, content of carbon fibers: 50% by mass) made of carbon fibers (average fiber length: 30 mm, average fiber diameter: 7 μm) impregnated with polyamide 6 resin were sandwiched between two imide films (trade name: UPILEX 75S manufactured by Ube Industries, Ltd.) to have a structure of the film (a3)/the carbon fiber sheet, and the sandwich structure was pressed with a pressing machine (manufactured by Toyo Seiki Seisaku-sho, Ltd., trade name: Mini Test Press MP-WCH) under conditions of a head temperature of 220° C., a preheating time of one minute, a pressure of 2 MPa, and a pressing time of one minute, and the imide films were peeled off after the pressing, thus producing a composite laminate. The thickness of the A layer of the obtained composite laminate was 65 μm and the thickness of the B layer thereof was 0.375 mm. The surface (A layer side) of the obtained composite laminate was measured in terms of its maximum height (Sz) in conformity with ISO 25178 using a laser microscope (manufactured by Keyence Corporation, trade name: VK-X250). The results are shown in Table 2.

Using each of the above-obtained films (a3) in Examples 3 and 4 and Comparative Example 4, the film (a3) and a carbon fiber sheet (sheet thickness: 10 mm, content of carbon fibers: 50% by mass) made of carbon fibers (average fiber length: 30 mm, average fiber diameter: 7 μm) impregnated with polyamide 6 resin were sandwiched between two imide films (trade name: UPILEX 75S manufactured by Ube industries, Ltd.) to have a structure of the film (a3)/the carbon fiber sheet, and the sandwich structure was pressed with a pressing machine (manufactured by Toyo Seiki Seisaku-sho, Ltd., trade name: Mini Test Press MP-WCH) under conditions of a head temperature of 210° C., a preheating time of one minute, a pressure of 1 MPa, and a pressing time of one minute, and the imide films were peeled off after the pressing, thus producing a composite laminate. The thickness of the A layer of the obtained composite laminate was 58 μm and the thickness of the B layer thereof was 0.314 mm. The surface (A layer side) of the obtained composite laminate was measured in terms of its maximum height (Sz) in conformity with ISO 25178 using a laser microscope (manufactured by Keyence Corporation, trade name: VK-X250). The results are shown in Table 2.

Using each of the above-obtained films (a3) in Example 5 and Comparative Example 5, the film (a3) and a carbon fiber sheet (sheet thickness: 10 mm, content of carbon fibers: 50% by mass) made of carbon fibers (average fiber length: 30 mm, average fiber diameter: 7 μm) impregnated with polyamide 6 resin were sandwiched between two imide films (trade name: UPILEX 75S manufactured by Ube Industries, Ltd.) to have a structure of the film (a3)/the carbon fiber sheet, and the sandwich structure was pressed with a pressing machine (manufactured by Toyo Seiki Seisaku-sho, Ltd., trade name: Mini Test Press MP-WCH) under conditions of a head temperature of 325° C., a preheating time of one minute, a pressure of 1 MPa, and a pressing time of one minute, and the imide films were peeled off after the pressing, thus producing a composite laminate. The thickness of the A layer of the obtained composite laminate was 43 μm and the thickness of the B layer thereof was 0.542 mm. The surface (A layer side) of the obtained composite laminate was measured in terms of its maximum height (Sz) in conformity with ISO 25178 using a laser microscope (manufactured by Keyence Corporation, trade name: VK-X250). The results are shown in Table 2.

(Mold Releasability)

Using each of the above-obtained films (a3) in Examples 1 and 2 and Comparative Examples 1 to 3, the film (a3), a carbon fiber sheet (sheet thickness: 10 mm, content of carbon fibers: 50% by mass) made of carbon fibers (average fiber length: 30 mm, average fiber diameter: 7 μm) inpregnated with polyamide 6 resin, and an imide film (trade name: UPILEX 75S manufactured by Ube Industries, Ltd.) were stacked in this order on a metallic plate (steel SS400), and the stack was pressed with a pressing machine (manufactured by Toyo Seiki Seisaku-sho, Ltd., trade name: Mini Test Press MP-WCH) under conditions of a head temperature of 220° C, a preheating time of one minute, a pressure of 2 MPa, and a pressing time of one minute. After the pressing, the imide film was pulled up 90° above the metallic plate to peel off the imide film from the metallic plate. Upon peeling of the imide film, the composite laminate completely peeled off from the metallic plate together with the imide film was evaluated with a "Good" sign, the composite laminate partly left on the metallic plate was evaluated with a "Fair" sign, and the composite laminate in which the composite laminate itself was not peeled off from the metallic plate but only the imide film was peeled off was evaluated with a "Poor" sign. The results are shown in Table 2.

Using each of the above-obtained films (a3) in Examples 3 and 4 and Comparative Example 4, the film (a3), a carbon fiber sheet (sheet thickness: 10 mm, content of carbon fibers: 50% by mass) made of carbon fibers (average fiber length: 30 mm, average fiber diameter: 7 μm) impregnated with polyamide 6 resin, and an imide film (trade name: UPILEX 75S manufactured by Ube Industries, Ltd.) were stacked in this order on a metallic plate (steel SS400), and the stack was pressed with a pressing machine (manufactured by Toyo Seiki Seisaku-sho, Ltd., trade name: Mini Test Press MP-WCH) under conditions of a head temperature of 210° C., a preheating time of one minute, a pressure of 1 MPa, and a pressing time of one minute. After the pressing, the imide film was pulled up 90° above the metallic plate to peel off the imide film from the metallic plate. Upon peeling of the imide film, the composite laminate completely peeled off from the metallic plate together with the imide film was evaluated with a "Good" sign, the composite laminate partly left on the metallic plate was evaluated with a "Fair" sign, and the composite laminate in which the composite laminate itself was not peeled off from the metallic plate but only the imide film was peeled off was evaluated with a "Poor" sign. The results are shown in Table 2.

Using each of the above-obtained films (a3) in Example 5 and Comparative Example 5, the film (a3), a carbon fiber sheet (sheet thickness: 10 mm, content of carbon fibers: 50% by mass) made of carbon fibers (average fiber length: 30 mm, average fiber diameter: 7 μm) impregnated with polyamide 6 resin, and an imide film (trade name: UPILEX 75S manufactured by Ube Industries, Ltd.) were stacked in this order on a metallic plate (steel SS400), and the stack was pressed with a pressing machine (manufactured by Toyo Seiki Seisaku-sho, Ltd., trade name: Mini Test Press MP-WCH) under conditions of a head temperature of 325° C, a preheating time of one minute, a pressure of 1 MPa, and a pressing time of one minute. After the pressing, the imide film was pulled up 90° above the metallic plate to peel off the imide film from the metallic plate. Upon peeling of the imide film, the composite laminate completely peeled off from the metallic plate together with the imide film was evaluated with a "Good" sign, the composite laminate partly left on the metallic plate was evaluated with a "Fair" sign, and the composite laminate in which the composite laminate itself was not peeled off from the metallic plate but only the imide film was peeled off was evaluated with a "Poor" sign. The results are shown in Table 2.

TABLE 3

|  | Ex. 1 | Comp. Ex. 1 |
|---|---|---|
| Sheet Adhesion | Good | Poor |

(Machinability)

The composite laminates produced using the respective films (a3) in Examples 3 and 4 and Comparative Example 4 and used for the evaluation of the maximum heights (Sz) were cut into a shape of 90 mm long×50 mm wide (flat plate) by an abrasive waterjet cutter. The cutting conditions were as follows: a nozzle diameter φ of 0.76 mm, a water pressure of 400 MPa, a cutting speed of 200 mm/min, an amount of water of about 2.5 L/min, and an amount of abrasive (garnet #80) used of 400 g/min.

The composite laminates were evaluated in terms of the degree of development of burrs from their cut surfaces after the cutting process: the composite laminate on which no burr was found was evaluated with a "Good" sign, the composite laminate on which small burrs (burrs easily removable by hand) were found was evaluated with a "Fair" sign, and the composite laminate on which large burrs (burrs removable only with a tool) were found was evaluated with a "Poor" sign. The results of the evaluations are shown in Table 4.

|  | Ex. 3 | Ex. 4 | Comp. Ex. 4 |
|---|---|---|---|
| Machinability | Good | Fair | Poor |

TABLE 2

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| Maximum Height Sz (μm) | 34 | 45 | 27 | 34 | 36 | 117 | 58 | 57 | 108 | 131 |
| Mold Releasability | Good | Fair | Good | Fair | Good | Good | Poor | Poor | Poor | Poor |

(Sheet Adhesion)

Using each of the above-obtained films (a3) in Example 1 and Comparative Example 1, the film (a3) and a carbon fiber sheet (sheet thickness: 10 mm, content of carbon fibers: 50% by mass) made of carbon fibers (average fiber length: 30 mm, average fiber diameter: 7 μm) impregnated with polyamide 6 resin were sandwiched between two imide films (trade name: UPILEX 75S manufactured by Ube Industries, Ltd.) to have a structure of the film (a3)/the carbon fiber sheet, and the sandwich structure was pressed with a pressing machine (manufactured by Toyo Seiki Seisaku-sho, Ltd., trade name: Mini Test Press MP-WCH) under conditions of a head temperature of 220° C., a preheating time of one minute, a pressure of 2 MPa, and a pressing time of one minute, and the imide films were peeled off after the pressing, thus producing a composite laminate. A margin of the film (a3) to pinch was left at one end of the composite laminate.

With the composite laminate fixed, the margin of the films (a3) to pinch was pulled up 90° above the surface of the composite laminate at a rate of 20 mm/min with an Autograph. The composite laminate in which the film (a3) was not peeled off from the interface with the carbon fiber sheet was evaluated with a "Good" sign, whereas the composite laminate in which the film (a3) was peeled off from the interface with the carbon fiber sheet was evaluated with a "Poor" sign. The results in Example 1 and Comparative Example 1 are shown in Table 3.

(Mechanical Properties)

The composite laminates produced using the respective films (a3) in Example 3 and comparative Example 4 and used for the evaluation of the maximum heights (Sz) were cut into a shape of a JIS test piece (bending test piece) by an abrasive waterjet cutter. The cutting conditions were as follows: a nozzle diameter φ of 0.76 mm, a water pressure of 400 MPa, a cutting speed of 200 mm/min, an amount of water of about 2.5 L/min, and an amount of abrasive (garnet #80) used of 400 g/min.

The obtained bending test pieces were subjected to a 60 mm-span three-point bending test with a tester Autograph AG-5000 (manufactured by shimadzu corporation) in conformity with JIS K7171 to measure their bending strengths, bending moduli of elasticity, and bending deflections. The results are shown in Table 5.

It was found from the results in Table 5 that the composite laminate according to the present invention was increased in mechanical properties by the bonding of a sheet containing inorganic fibers to the surface of a carbon fiber sheet and was therefore excellent as a structure.

(Coating Adhesion)

The composite laminates produced using the respective films (a3) in Example 3 and Comparative Example 4 and used for the evaluation of the maximum heights (Sz) were cut into a shape of 90 mm long×50 mm wide (flat plate) by an abrasive waterjet cutter. The cutting conditions were as follows: a nozzle diameter φ of 0.76 mm, a water pressure of 400 MPa, a cutting speed of 200 mm/min, an amount of water of about 2.5 L/min, and an amount of abrasive (garnet #80) used of 400 g/min.

The surfaces of the obtained flat plates were degreased with a solvent and then coated with a two-pack acrylic urethane-based paint (manufactured by Fujikura Kasei Co., Ltd., trade name: RECRACK #110) to have a coating thickness of 18 µm and the coated surfaces were further coated with a clear coating to have a coating thickness of 13 µm. After the coating, the flat plates were subjected to a cutting test with a cutter. The groove widths of the cut portions are shown in Table 5.

It was found from the results in Table 5 that, in the composite laminate according to the present invention, the groove width of the portion cut with a cutter blade was reduced by the bonding of a sheet containing inorganic fibers to the surface of a carbon fiber sheet and, therefore, the composite laminate was excellent in coating adhesion against external factors.

TABLE 5

|  |  | Ex. 3 | Comp. Ex. 4 |
|---|---|---|---|
| Mechanical Properties | Bending strength (MPa) | 578 | 510 |
|  | Bending modulus (GPa) | 26 | 26 |
|  | Bending deflection (%) | 2.3 | 2.1 |
| Coating Adhesion (µm) |  | 54 | 91 |

REFERENCE SIGNS LIST 1, 21 . . . composite laminate
2 . . . A layer
3 . . . B layer
3a . . . first principal surface
3b . . . second principal surface

The invention claimed is:

1. A composite laminate comprising an A layer and a B layer, the A layer being provided on one or both sides of the B layer, the A layer consisting of inorganic fibers (a1) with an average fiber length of 1 µm to 300 µm and a thermoplastic resin (a2) and 5% by mass or less of other additives of a total amount of 100% of all components in the A layer, the B layer containing reinforcing fibers (b1) with an average fiber length of 1 mm or more and a thermoplastic resin (b2), the inorganic fibers (a1) being at least one selected from the group consisting of potassium titanate and wollastonite, and the thickness of the A layer being thinner than the thickness of the B layer.

2. The composite laminate according to claim 1, wherein the inorganic fibers (a1) have an average aspect ratio of 3 to 200.

3. The composite laminate according to claim 1, wherein the inorganic fibers (a1) is potassium titanate.

4. The composite laminate according to claim 1, wherein a content of the inorganic fibers (a1) is 1% by mass to 40% by mass in a total amount of 100% by mass of all components contained in the A layer.

5. The composite laminate according to claim 1, wherein the reinforcing fibers (b1) are at least one selected from the group consisting of carbon fibers, glass fibers, and aramid fibers.

6. The composite laminate according to claim 1, wherein the reinforcing fibers (b1) have an average fiber diameter of 1 µm to 50 µm.

7. The composite laminate according to claim 1, wherein a content of the reinforcing fibers (b1) is 10% by mass to 80% by mass in a total amount of 100% by mass of all components contained in the B layer.

8. The composite laminate according to claim 1, wherein the thermoplastic resin (a2) is at least one selected from the group consisting of polyolefin resin, polystyrene-based resin, polyester-based resin, aliphatic polyamide (PA) resin, semi-aromatic polyamide (PA) resin, polyphenylene sulfide (PPS) resin, aromatic polyether ketone resin, polyetherimide (PEI) resin, and thermoplastic polyimide (TPI) resin.

9. The composite laminate according to claim 1, wherein the thermoplastic resin (b2) is at least one selected from the group consisting of polyolefin resin, polystyrene-based resin, polyester-based resin, aliphatic polyamide (PA) resin, semi-aromatic polyamide (PA) resin, polyphenylene sulfide (PPS) resin, aromatic polyether ketone resin, polyetherimide (PEI) resin, and thermoplastic polyimide (TPI) resin.

10. The composite laminate according to claim 1, wherein a maximum height (Sz) of a surface of the A layer is 50 µm or less.

11. The composite laminate according to claim 1, being used for motor vehicle members.

12. A method for producing the composite laminate according to claim 1, the method comprising: disposing a film (a3) containing inorganic fibers (a1) with an average fiber length of 1 µm to 300 µm and a thermoplastic resin (a2) on one or both sides of a sheet (b3) containing reinforcing fibers (b1) with an average fiber length of 1 mm or more and a thermoplastic resin (b2) to form a stack; and applying heat and pressure to the stack to integrate the sheet (b3) and the film (a3).

13. The method for producing the composite laminate according to claim 12, wherein the film (a3) has a thickness of less than 500 µm.

14. The method for producing the composite laminate according to claim 12, wherein the sheet (b3) has a thickness of 0.3 mm to 15 mm.

15. The composite laminate according to claim 1, wherein the A layer is provided directly on one side or both sides of the B layer.

* * * * *